UNITED STATES PATENT OFFICE.

BRUNO HARRASS, OF BÖHLEN, NEAR GROSS BREITENBACH, SCHWARZ-BURG-RUDOLSTADT, GERMANY.

PLASTIC COMPOUND.

SPECIFICATION forming part of Letters Patent No. 254,964, dated March 14, 1882.

Application filed August 2, 1881. (Specimens.)

*To all whom it may concern:*

Be it known that I, BRUNO HARRASS, of Böhlen, near Gross Breitenbach, in the Principality of Schwarzburg-Rudolstadt, Germany, have invented a new and Improved Plastic Compound, of which the following is a full, clear, and exact description.

The object of my invention is to provide new and improved articles of all kinds of an improved plastic compound.

In carrying out my invention I mix paper-pulp or cellulose, about three parts, by weight; starch, about one part, by weight; flour, about two parts, by weight. Cellulose, which is sold as paper sheets, is dissolved in water and disintegrated and placed in a fine sieve to permit the water to flow off. The starch used can be made from wheat, rye, potatoes, corn, &c., and any kind of flour—such as wheat, rye, or corn flour—can be used, this flour containing all its gluten. This mixture of cellulose, starch, and flour is boiled in a suitable vessel, preferably made of sheet metal, in a water bath for one hour, and the mixture is then cooled at the ordinary temperature. By being boiled the mixture is converted into a fibrous paste, which is then mixed with a suitable quantity of sawdust. This mass is then rolled into sheets, and is dried in the air or in a suitable drying apparatus, upon which they are ready for use. The mixture may also be pressed in molds of metal of sufficient hardness and strength, and I prefer to use iron, steel, or brass molds. The molds and the press must be warmed or heated and a sufficient pressure must be exerted.

I have heated the molds to 248° Fahrenheit and exerted a pressure of ten thousand pounds per square inch; but the pressure can be varied as circumstances may require, flat objects requiring less pressure than objects to be made in high relief. By the action of the heat and the pressure the mass will be like india-rubber, and will fill all the recesses, &c., of the mold. The object is taken out of the mold while hot, and when it has cooled it resembles wood, is hard and elastic, and finally gets to be as hard as stone. These objects can be treated in the same manner as wood, with a saw, plane, rasp, chisel, graver, and can be colored, polished, and glued.

If objects are to be made with the front side covered with veneer, from one to six sheets of thin veneers (which are covered on one side with some adhesive substance—such as glue, shellac, &c.—and then dried) are placed into the warmed or heated mold. Upon these veneers a layer of one thirty-second to one-eighth of an inch thick of the powdered wood mass, colored the same as the veneer, is spread. For flat objects—such as reliefs, escutcheons, heads, &c.— it is sufficient to press them once, whereby the veneers have become so firmly united with the wood mass that they cannot be separated. If the objects have high relief, the veneers, prepared as above, are placed in the molds, a layer of powdered wood is first spread over them, and the spaces are then filled up with my artificial wood mass. The objects are then pressed to give the same an approximate shape. Then the mold is removed from the press and the object from the mold, and a piece of veneer is placed over those places not properly covered by the veneer. Then a sheet of veneer is placed in the mold, the object is placed upon it, and the mold is again placed into the press and the full pressure is exerted. After having been pressed sufficiently the object is removed from the hot mold, and is then cooled. To prevent the objects from warping I add some white pipe-clay to the mass. This clay causes the mass to enter the recesses of the mold better and to give better and sharper reliefs and edges.

The molded objects made of this mass may be covered with veneer by placing a veneer sheet that has been glued on the inner side on the mold, and the object is placed on this veneer, and the mold is then placed in the press; but articles made in this way are apt to warp, and I prefer to use a layer of the dry powdered wood mass. I add a certain percentage of binding material—such as dextrine, albumen, blood, shellac, &c. The blood cannot be used fluid, but must be dried and baked and then powdered.

A good dry powdered mass can be obtained by mixing two to five quarts of cellulose, six to thirty quarts of sawdust, one to five quarts of dry dextrine, blood, albumen, rosin, or other binding materials powdered, one to five quarts of flour, one-eighth to two quarts of pipe-clay, chalk, plaster-of-paris, &c. Powdered color is added to give this mixture the desired tint. This powdered mixture is the one referred to above as powdered "wood mass," which is placed upon the veneers. Instead of making the entire article of this mass, a layer of certain thickness of this mass can be spread on the veneer and the rest can be filled in with a block of wood. In place of the block of wood a block of metal can be pressed into the article—for instance, if paper-weights, bases for lamps, &c., are to be made.

I am aware that the several ingredients of my composition for forming artificial wood have been used before; but I am not aware that they have ever been combined together in the above-named proportions, and What I therefore claim, and desire to secure by Letters Patent, is—

1. The herein-described composition for making imitation wood objects, consisting of cellulose, starch, flour, and a small quantity of sawdust, in the proportions stated, substantially as described.

2. The herein-described composition for the first layer on the veneer in making imitation or artificial wood objects, consisting of from two to ten parts of cellulose, six to thirty parts of sawdust, one to five parts of binding material—such as dextrine, albumen, &c.—one to five parts of flour, and one-eighth to two parts of pipe-clay, chalk, &c., as set forth.

This specification signed by me this 21st day of April, 1881.

BRUNO HARRASS.

Witnesses:
HUGO WILOSS,
BERTHOLD ROI.